(12) United States Patent
Nagi

(10) Patent No.: US 11,161,442 B2
(45) Date of Patent: Nov. 2, 2021

(54) SEATING ASSEMBLY HEAD RESTRAINT

(71) Applicant: Ford Global Technologies, LLC, Dearborn, MI (US)

(72) Inventor: Ranjit Nagi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 16/742,052

(22) Filed: Jan. 14, 2020

(65) Prior Publication Data
US 2021/0213860 A1   Jul. 15, 2021

(51) Int. Cl.
*B60N 2/818* (2018.01)
*B60N 2/815* (2018.01)
*B60N 2/897* (2018.01)

(52) U.S. Cl.
CPC ............. *B60N 2/818* (2018.02); *B60N 2/815* (2018.02); *B60N 2/897* (2018.02)

(58) Field of Classification Search
CPC ........ B60N 2/818; B60N 2/815; B60N 2/832; B60N 2/897
See application file for complete search history.

(56) References Cited

U.S. PATENT DOCUMENTS

| | | | | |
|---|---|---|---|---|
| 4,671,573 A * | 6/1987 | Nemoto | ................ | B60N 2/818 297/410 |
| 4,798,415 A * | 1/1989 | Tanino | .................. | B60N 2/838 297/410 |
| 4,854,642 A * | 8/1989 | Vidwans | ................ | B60N 2/818 297/410 |
| 4,976,493 A | 12/1990 | Frankila | | |
| 6,062,645 A * | 5/2000 | Russell | .................. | B60N 2/815 297/410 |
| 7,159,946 B2 * | 1/2007 | Gurtatowski | .......... | B60N 2/818 297/410 |
| 7,204,558 B2 * | 4/2007 | Tanaka | ................... | B60N 2/818 297/410 |
| 7,338,130 B2 | 3/2008 | Daume | | |
| 7,669,933 B2 * | 3/2010 | Watanabe | .............. | B60N 2/815 297/410 |
| 7,789,465 B2 | 9/2010 | Reel | | |
| 7,914,080 B2 * | 3/2011 | Runde | .................... | B60N 2/815 297/410 |
| 2005/0212343 A1 * | 9/2005 | Katahira | ................ | B60N 2/815 297/410 |
| 2006/0214492 A1 * | 9/2006 | Hassler | ................. | B60N 2/818 297/410 |

* cited by examiner

*Primary Examiner* — Philip F Gabler
(74) *Attorney, Agent, or Firm* — David Coppiellie; Price Heneveld LLP

(57) ABSTRACT

A vehicle seating assembly is disclosed herein. The seating assembly includes a head restraint having a post. A seatback is configured to receive a portion of the post. The stop feature is coupled to the seatback and is movable between a disengaged position and an engaged position. In the engaged position, the stop feature is configured to generally prevent inward movement and allow outward movement of the post relative to the seatback.

20 Claims, 6 Drawing Sheets

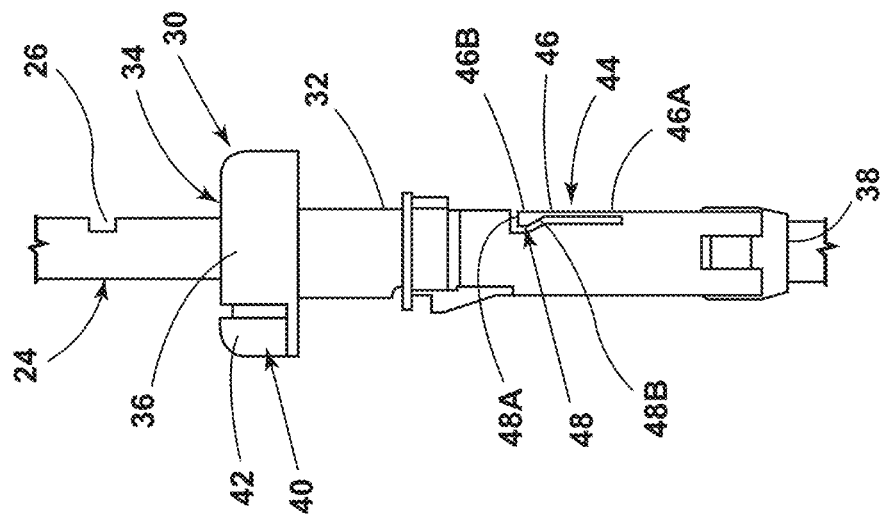
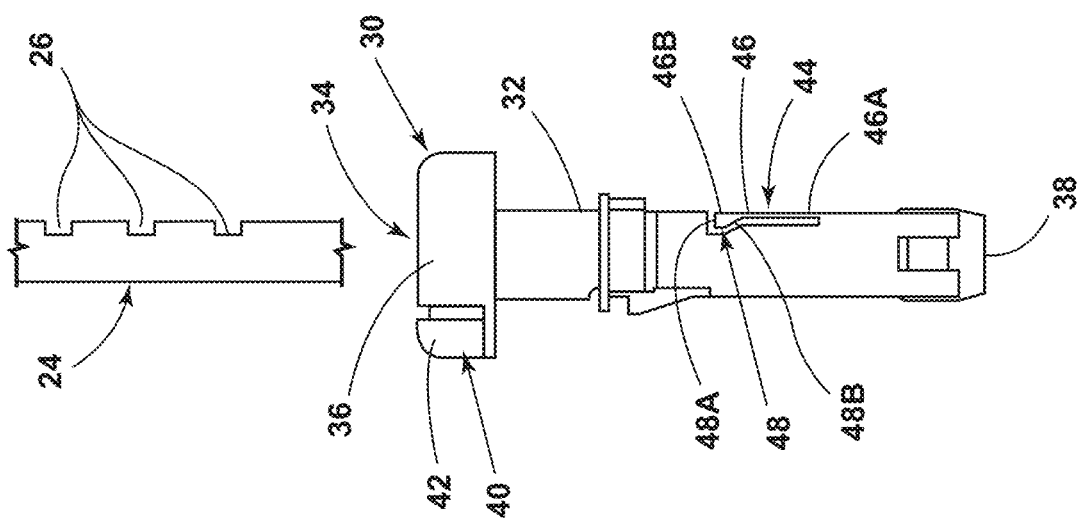
FIG. 4B
FIG. 4A

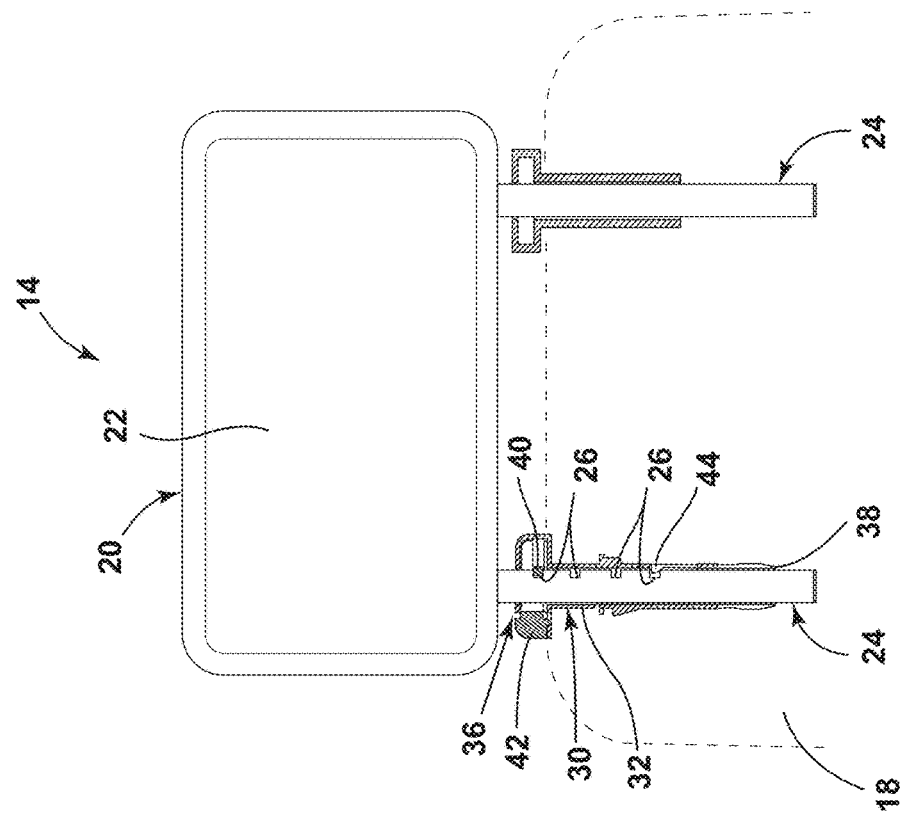
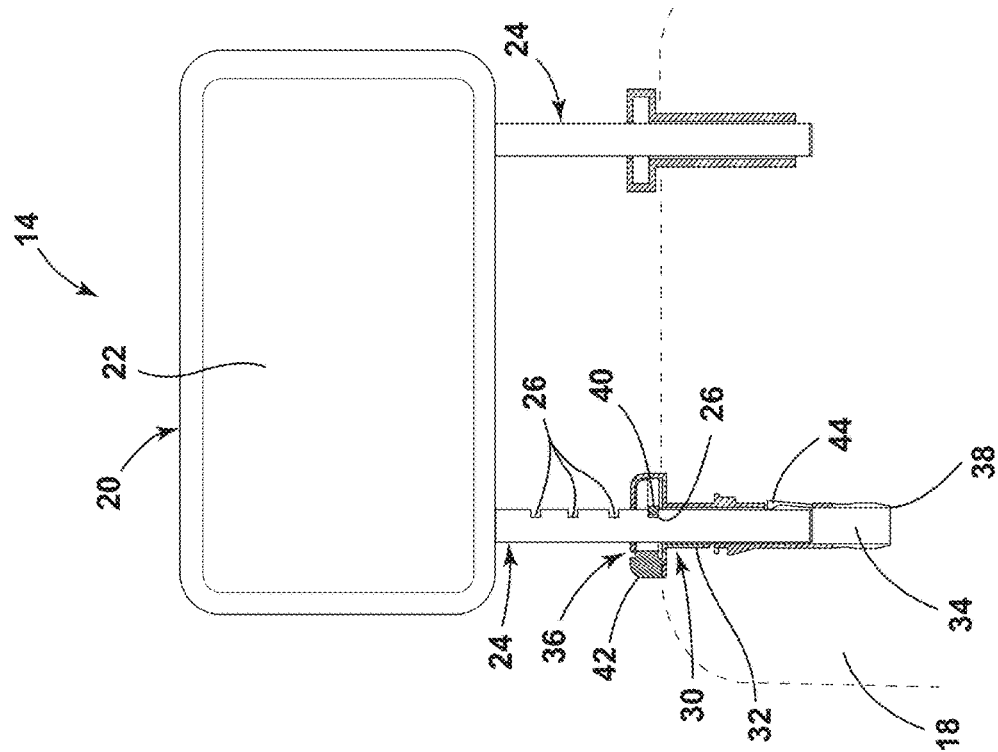
FIG. 7A
FIG. 7B

SEATING ASSEMBLY HEAD RESTRAINT

FIELD OF THE DISCLOSURE

The present disclosure generally relates to an adjustable head restraint for a seating assembly. More specifically, the present disclosure relates to a seating assembly that includes a stop feature for generally preventing inward movement of the head restraint relative to a seatback of the seating assembly.

BACKGROUND OF THE DISCLOSURE

Vehicle seating assemblies commonly include head restraints. The head restraints are often adjustable relative to seatbacks of the seating assemblies. Limiting downward adjustment of the head restraints relative to the seatbacks of the seating assemblies may be desirable.

SUMMARY OF THE DISCLOSURE

According to a first aspect of the present disclosure, a vehicle seating assembly includes a seatback coupled to a seat-base. A receiving feature is coupled to the seatback. A locking feature is coupled to the receiving feature. A stop feature is coupled to the receiving feature. The head restraint is operably coupled to the seatback and includes a body and a post protruding outward from the body. The post is configured for mating engagement with the receiving feature. A plurality of notches are defined by the post. The post is operable to move within the receiving feature in an inward direction and an outward direction relative to the seatback to adjust the position of the head restraint relative to the seatback. The locking feature is operable between a locked condition, in which the locking feature is engaged with at least one of the plurality of notches to generally prevent movement of the post in both the inward and outward directions relative to the seatback, and an unlocked condition, in which the locking feature is not engaged with the plurality of notches, such that movement of the post within the receiving feature in the inward and outward directions is generally unimpeded by the locking feature. The stop feature is operable between a disengaged position and an engaged position, in which the stop feature is engaged with at least one of the plurality of notches, such that movement of the post in the inward direction is generally prevented, and movement of the post in the outward direction causes the stop feature to move from the engaged position to the disengaged position.

Embodiments of the first aspect of the present disclosure may include any one or a combination of the following features:

- the head restraint is operable between a plurality of locking positions, each characterized by the locking feature being in the locked condition, and a low position, wherein the stop feature is in the engaged position;
- the position of the head restraint while in the seatback-outward-most locking position is a first distance in the outward direction from the position of the head restraint while in the low position;
- the head restraint is operable to enter one of the plurality of locking positions when moved in the outward direction from the low position a second distance, wherein the second distance is about one half of the first distance;
- movement of the head restraint in the outward direction from a first position to a second position causes the head restraint to enter one of the plurality of locking positions, the first position is a second distance from the low position in the outward direction, the second position is a third distance from the first position in the outward direction, the second distance is about one half of the first distance, and the third distance is between about 1 mm and about 10 mm;
- the receiving feature comprises a guide sleeve at least partially disposed within the seatback;
- the stop feature comprises an elongated member coupled to the guide sleeve at a first end and extending from the first end to a second end that is distal from the first end;
- the second end of the elongated member is more proximate to the body of the head restraint than the first end of the elongated member when the head restraint is in the low position;
- the elongated member is biased toward the engaged position while in the disengaged position;
- the elongated member is configured to resiliently flex as the elongated member moves from the engaged position to the disengaged position;
- the elongated member includes a head portion proximate the second end of the elongated member and comprising an upper surface configured to engage an upper notch-defining wall of the post when the stop feature is in the engaged position, and a lower surface configured to contact a portion of the post as the movement of the post in the outward direction causes the stop feature to move toward the disengaged position, wherein the angle of incidence between the lower surface and the portion of the post contacting the lower surface causes the stop feature to move toward the disengaged position as the post moves in the outward direction; and
- the notch engaged by the locking feature when the head restraint is in the seatback-outward-most locking position is engaged by the stop feature when the head restraint is in the low position.

According to a second aspect of the present disclosure, a vehicle seating assembly includes a head restraint having a body and a post extending outward from the body. A receiving feature is coupled to a seatback and is configured to receive the post. The stop feature is coupled to the receiving feature and is operable to move from a disengaged position to an engaged position, wherein the stop feature is generally configured to prevent movement of the post within the receiving feature in a first direction and allow movement of the post within the receiving feature in a second direction generally opposite the first direction. Movement in the second direction causes the body of the head restraint to move generally away from the seatback. Movement of the post within the receiving feature in the second direction causes the stop feature to move from the engaged position to the disengaged position.

Embodiments of the second aspect of the present disclosure may include any one or a combination of the following features:

- the stop feature is configured to be engaged with a notch defined by the post while in the engaged position;
- the stop feature is configured to be in contact with the post while in the disengaged position when the post is received within the receiving feature; and
- the stop feature is biased toward the engaged position.

According to a third aspect of the present disclosure, a vehicle seating assembly includes a head restraint having a post. A seatback is configured to receive a portion of the post. A stop feature is coupled to the seatback and is movable between a disengaged position and an engaged position, wherein the stop feature is configured to generally prevent inward movement and allow outward movement of the post relative to the seatback.

Embodiments of the third aspect of the present disclosure may include any one or a combination of the following features:
- outward movement of the post causes the stop feature to move from the engaged position to the disengaged position;
- the stop feature is generally biased toward the engaged position; and
- the stop feature is configured to be in contact with the post while in the disengaged position when the post is received within the seatback.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 4A is a frontal view of a receiving feature, illustrating a portion of the post of the head restraint disposed above a mouth portion of the receiving feature configured to receive the post, according to one embodiment;

FIG. 4B is a frontal view of the receiving feature, illustrating the post of the head restraint disposed within the receiving feature, according to one embodiment;

FIG. 7A is a sectional view of the receiving feature disposed within a portion of the seating assembly shown in phantom, illustrating the head restraint in a raised position relative to the seating assembly, wherein the locking feature is in the locked condition, such that the locking feature is engaged with a notch defined by the post of the head restraint, and the stop feature is in the disengaged position, according to one embodiment; and FIG. 7B a sectional view of the receiving feature disposed within a portion of the seating assembly shown in phantom, illustrating the head restraint in a low position relative to the seatback of the seating assembly, wherein the stop feature is in the engaged position, such that the stop feature is engaged with a notch defined by the post of the head restraint to generally prevent further inward movement of the head restraint relative to the seatback, according to one embodiment.

DETAILED DESCRIPTION OF THE PREFERRED EMBODIMENTS

Figure 1:
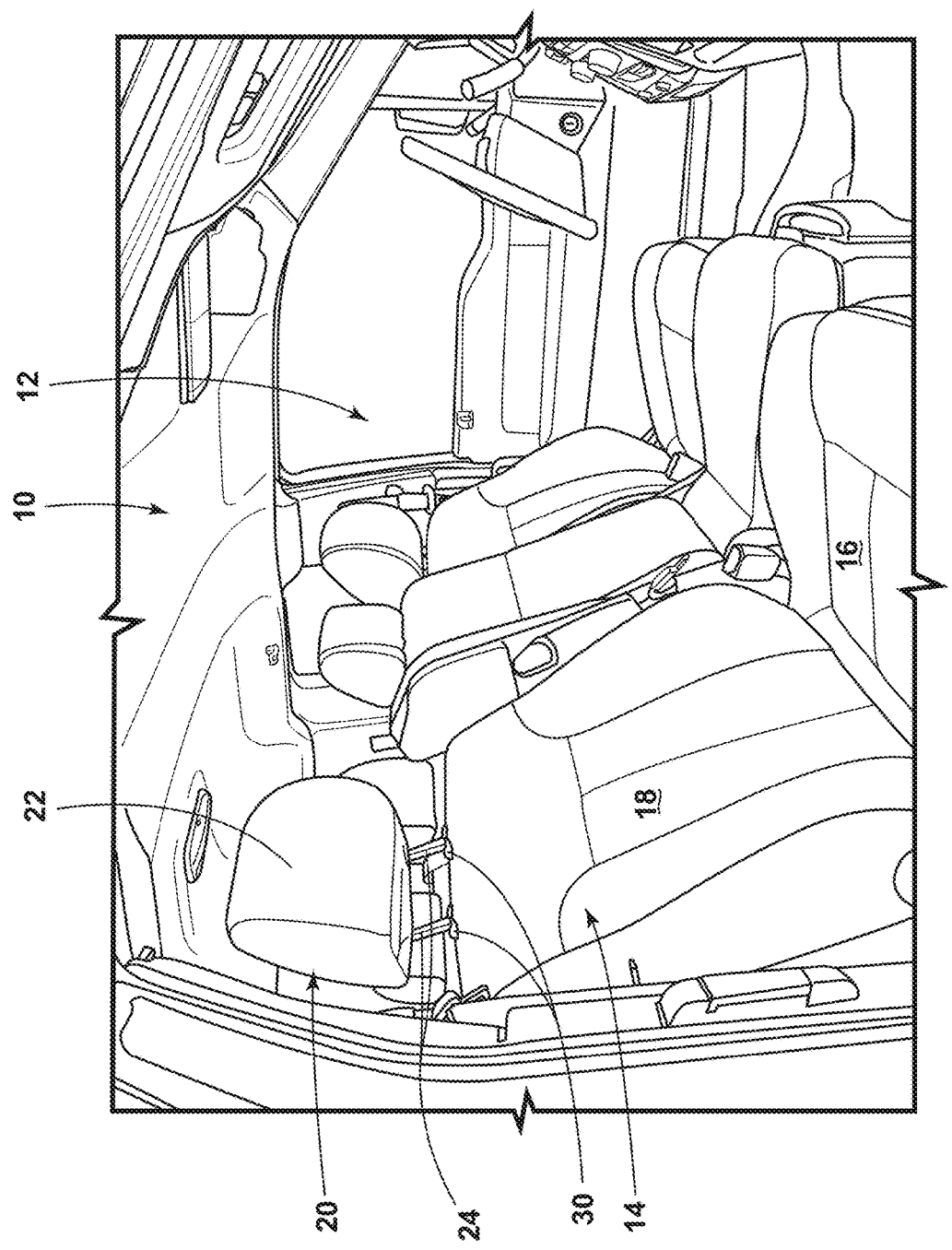
FIG. 1 is a perspective view of a vehicle interior, illustrating a seating assembly disposed within the vehicle interior and having a head restraint coupled thereto, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-7B, in various embodiments, a seating assembly 14 for a vehicle 10 may include a seatback 18 coupled to a seat-base 16. A receiving feature 30 may be coupled to the seatback 18. A locking feature 40 may be coupled to the receiving feature 30. A stop feature 44 may be coupled to the receiving feature 30. A head restraint 20 may be operably coupled to the seatback 18 and may include a body 22 and a post 24 that protrudes outward from the body 22. The post 24 may be configured for mating engagement with the receiving feature 30. A plurality of notches 26 may be defined by the post 24. The post 24 may be operable to move within the receiving feature 30 in an inward direction and an outward direction relative to the seatback 18 to adjust the position of the head restraint 20 relative to the seatback 18. The locking feature 40 may be operable between a locked condition and an unlocked condition. In the locked condition, the locking feature 40 may be engaged with at least one of the plurality of notches 26 defined by the post 24 of the head restraint 20 to generally prevent movement of the post 24 in both the inward and outward directions relative to the seatback 18. In the unlocked condition, the locking feature 40 may be not engaged with the plurality of notches 26, such that movement of the post 24 within the receiving feature 30 in the inward and outward directions is generally unimpeded by the locking feature 40. The stop feature 44 may be operable between a disengaged position and an engaged position. In the engaged position, the stop feature 44 may be engaged with at least one of the plurality of notches 26, such that movement of the post 24 in the inward direction is generally prevented and movement of the post 24 in the outward direction causes the stop feature 44 to move from the engaged position to the disengaged position.

Referring now to FIG. 1, the seating assembly 14 is illustrated. In various embodiments, the seating assembly 14 may be a vehicle seating assembly 14. In other words, in various embodiments, the seating assembly 14 may be disposed within a vehicle interior 12 of the vehicle 10. It is contemplated that, in various embodiments, the seating assembly 14 may be a variety of types of seating assemblies 14 for use in vehicles 10 (e.g., captain's chair, bench-style seating, etc.) As illustrated in FIG. 1, in various embodiments, the seating assembly 14 may include the seat-base 16 and the seatback 18 coupled to the seat-base 16.

Figure 3:
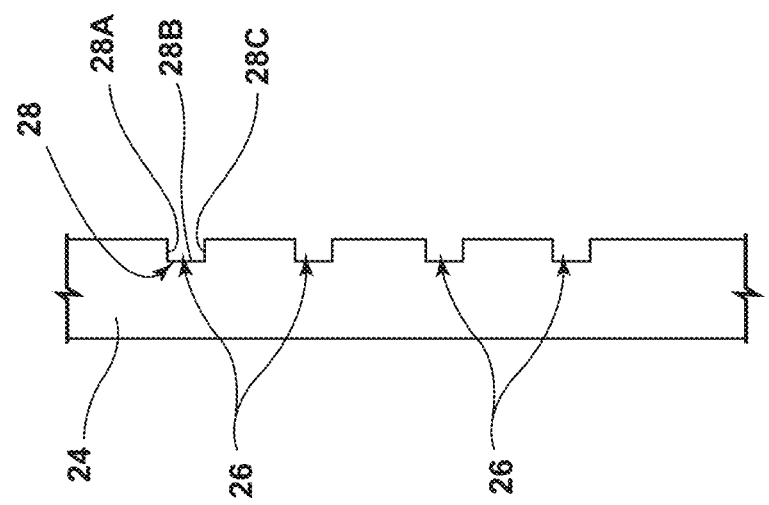
FIG. 3 is a frontal view of a portion of the post of the head restraint, illustrating the plurality of notches defined by the post, according to one embodiment.
Figure 2:
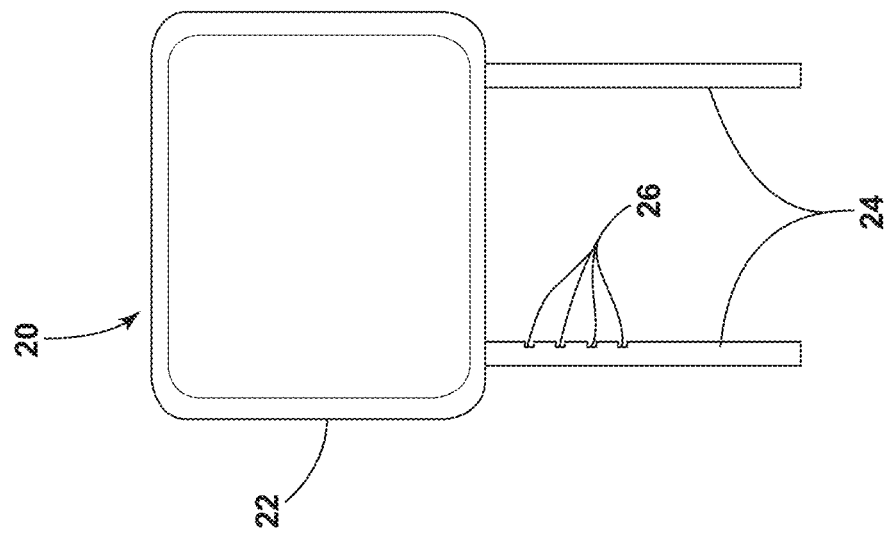
FIG. 2 is a frontal view of the head restraint, illustrating a post extending outward from a body of the head restraint and defining a plurality of notches, according to one embodiment.

Referring now to FIGS. 1-3, the seating assembly 14 may include the head restraint 20. The head restraint 20 may be coupled to the seatback 18. In various embodiments, the head restraint 20 may include the body 22 and the post 24 extending outward from the body 22. It is contemplated that, in various embodiments, a plurality of posts 24 may extend outward from the body 22 (e.g., two posts 24, as shown in FIG. 2). As shown in FIGS. 2 and 3, in various embodiments, the post 24 may define the plurality of notches 26. As such, in various embodiments, the post 24 of the head restraint 20 may include a plurality of notch-defining walls 28, as illustrated in FIG. 3. As shown in FIG. 3, a notch 26 of the post 24 may be defined by an upper notch-defining wall 28A, a back notch-defining wall 28B, and a lower notch-defining wall 28C, disposed generally therebetween. It is contemplated that in various embodiments, the upper and lower notch-defining walls 28A, 28C may converge and meet one another, such that the upper and lower notch-defining walls 28A, 28C generally form the back notch-defining wall 28B. For example, the upper and lower notch-defining walls 28A, 28C may form the back notch-defining wall 28B in an embodiment that the notch 26 is V-shaped.

Referring now to FIGS. 1, 4A, 4B, 7A, and 7B, in various embodiments, the seatback 18 may be configured to receive at least a portion of the post 24 therein. In other words, the post 24 may be received by the seatback 18, such that at least a portion of the post 24 is disposed within the seatback 18.

Referring now to FIGS. 1 and 4A-7B, in various embodiments, the seating assembly 14 may include the receiving feature 30 configured to receive at least a portion of the post 24 therein. In various embodiments, the receiving feature 30 may be coupled to the seatback 18 of the seating assembly 14, as shown in FIG. 1. In some embodiments, the receiving feature 30 may be disposed at least partially within the seatback 18, as illustrated in FIGS. 7A and 7B. In various embodiments, the receiving feature 30 may be configured to be matingly engaged by the post 24 of the head restraint 20. In other words, the post 24 of the head restraint 20 may be configured for mating engagement with the receiving feature 30, as shown in FIG. 4B, in which the post 24 is illustrated as extending through a hollow 34 defined by the receiving feature 30.

In various embodiments, the receiving feature 30 may include a guide sleeve 32. The guide sleeve 32 may be at least partially disposed within the seatback 18, as illustrated in FIGS. 7A and 7B. The guide sleeve 32 may define the hollow 34 with which the post 24 of the head restraint 20 is configured to matingly engage. In other words, the post 24 may be received within the hollow 34 defined by the guide sleeve 32. In various embodiments, the guide sleeve 32 may include a mouth portion 36 and a tail portion 38. The mouth portion 36 of the guide sleeve 32 may be disposed on an exterior of the seatback 18 of the seating assembly 14. In some embodiments, the mouth portion 36 of the guide sleeve 32 may be disposed proximate to the exterior portion of the seating assembly 14. As shown in FIGS. 7A and 7B, in various embodiments, the mouth portion 36 of the guide sleeve 32 may rest on top of the seatback 18 of the seating assembly 14. The tail portion 38 of the guide sleeve 32 may be disposed within the seatback 18 of the seating assembly 14, in various embodiments. In some embodiments, the tail portion 38 may be disposed generally seatback-downward of the mouth portion 36 of the guide sleeve 32 when the guide sleeve 32 is assembled to the seatback 18.

Referring now to FIGS. 4A-5B, 7A, and 7B, in various embodiments, the seating assembly 14 may include the locking feature 40, which may be configured to lock the head restraint 20 in a position relative to the seatback 18. In various embodiments, the locking feature 40 may be coupled to the receiving feature 30. In some embodiments, the locking feature 40 may be disposed generally proximate to the mouth portion 36 of the receiving feature 30, as shown in FIGS. 4A-5B. In various embodiments, the locking feature 40 may be operable between a locked condition and an unlocked condition. In the locked condition, the locking feature 40 may be engaged with the post 24 of the head restraint 20, such that movement of the post 24 in both the inward and outward directions relative to the seatback 18 is generally prevented. In the unlocked condition, the locking feature 40 may be not engaged with the post 24 of the head restraint 20, such that movement of the post 24 relative to the seatback 18 in both the inward and outward directions is generally unimpeded by the locking feature 40. It is contemplated that, in various embodiments, the locking feature 40 may be in contact with the post 24 and even applying some pressure to the post 24 while in the unlocked condition.

Figure 5B:
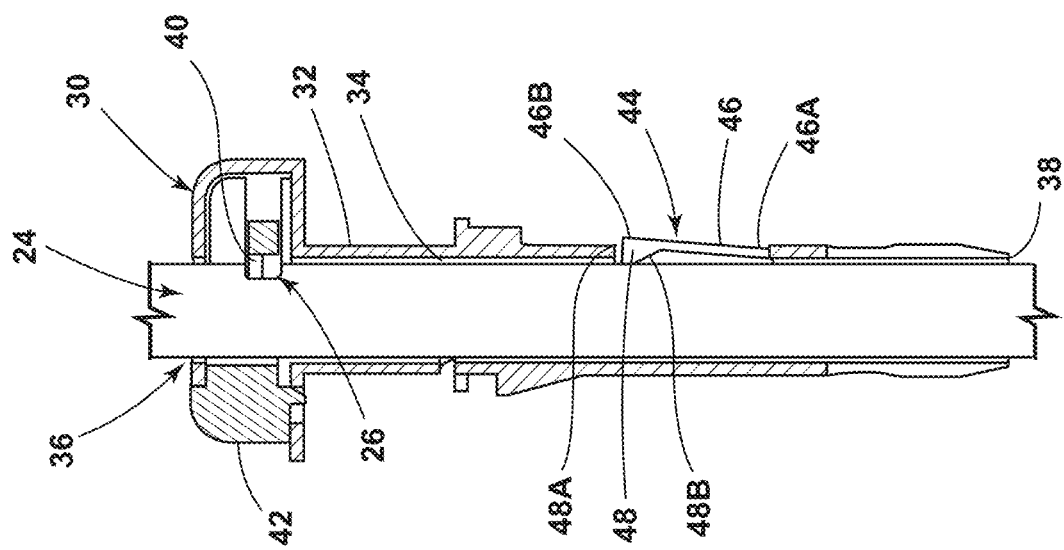
FIG. 5B is a sectional view of the receiving feature with a portion of the post disposed therein, illustrating the locking feature in an unlocked condition, according to one embodiment.
Figure 5A:
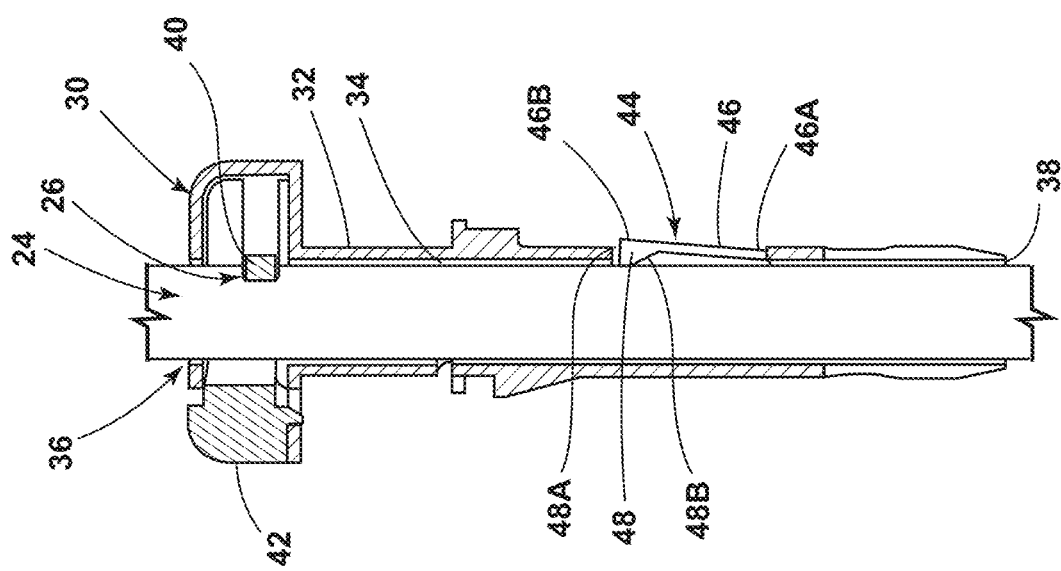
FIG. 5A is a frontal-sectional view of the receiving feature with a portion of the post disposed therein, illustrating a locking feature in a locked condition, according to one embodiment.

In some embodiments, the locking feature 40 may be operable to be engaged with at least one of the plurality of notches 26 defined by the post 24 of the head restraint 20 while in the locked condition, as shown in FIG. 5A. In such embodiments, the locking feature 40 may move from the locked condition to the unlocked condition, such that the portion of the locking feature 40 that engages the at least one of the plurality of notches 26 defined by the post 24 when the locking feature 40 is in the locked condition is moved in such a way that the at least one of the plurality of notches 26 is no longer engaged by the locking feature 40, as shown in FIG. 5B.

Referring still to FIGS. 4A-5B, in various embodiments, the locking feature 40 may be actuated between the locked condition and the unlocked condition via actuation of an actuator 42 by a user. In various embodiments, the actuator 42 may be coupled to the locking feature 40. For example, as shown in FIGS. 5A and 5B, the actuator 42 of the locking feature 40 may be a button configured to be depressed by a user to move the locking feature 40 from the locked condition to the unlocked condition. In the depicted embodiment, the actuator 42 of the locking feature 40 is fixedly coupled to the portion of the locking feature 40 that is configured to engage the at least one of the plurality of notches 26, and the actuator 42 is disposed on a side of the post 24 that is generally opposite the side of the post 24 that defines the plurality of notches 26. Accordingly, the actuator 42 is disposed further away from the post 24 when the locking feature 40 is engaged with one of the plurality of notches 26 than the actuator 42 is when the locking feature 40 is disengaged from the notch 26 in the unlocked condition, as demonstrated in FIGS. 5A and 5B. It is contemplated that the locking feature 40 may be biased toward the locked condition, such that actuation of the actuator 42 by a user is generally necessary to move the locking feature 40 from the locked condition to the unlocked condition. For example, in some embodiments, the locking feature 40 may be biased toward the locked condition by a spring or other biasing feature. It is further contemplated that the locking feature 40 may be at least one of a variety of different types of features configured to generally prevent inward and outward movement of the post 24 relative to the seatback 18.

Figure 6A:
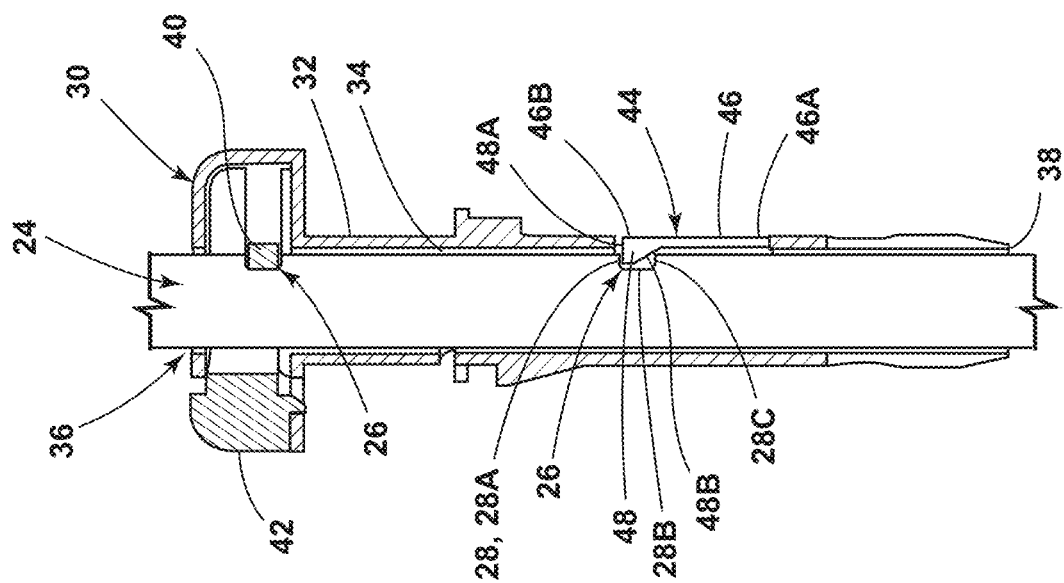
FIG. 6A is a sectional view of the receiving feature with a portion of the post disposed therein, illustrating a stop feature in a disengaged position, according to one embodiment.

Referring now to FIGS. 6A-7B, in various embodiments, the seating assembly 14 may include the stop feature 44. The stop feature 44 may be configured to generally prevent inward movement of the post 24 of the head restraint 20 relative to the seatback 18 of the seating assembly 14. In some embodiments, the stop feature 44 may be configured to generally prevent inward movement of the post 24 of the head restraint 20 within the receiving feature 30 coupled to the seatback 18 of the seating assembly 14. In various embodiments, the stop feature 44 may be coupled to the seatback 18 of the seating assembly 14. In some embodiments, the stop feature 44 may be coupled to the receiving feature 30. In some embodiments, the stop feature 44 may be coupled to the guide sleeve 32. As shown in FIGS. 6A and 6B, in some embodiments, the stop feature 44 may be coupled to the guide sleeve 32 and disposed nearer to the tail portion 38 of the guide sleeve 32 than the locking feature 40. In other words, the stop feature 44 may be nearer than the locking feature 40 to the tail portion 38 of the guide sleeve 32. In some embodiments, the stop feature 44 may be disposed farther from the mouth portion 36 of the guide sleeve 32 than the locking feature 40. In other words, the stop feature 44 may be farther than the locking feature 40 from the mouth portion 36 of the guide sleeve 32.

Figure 6B:
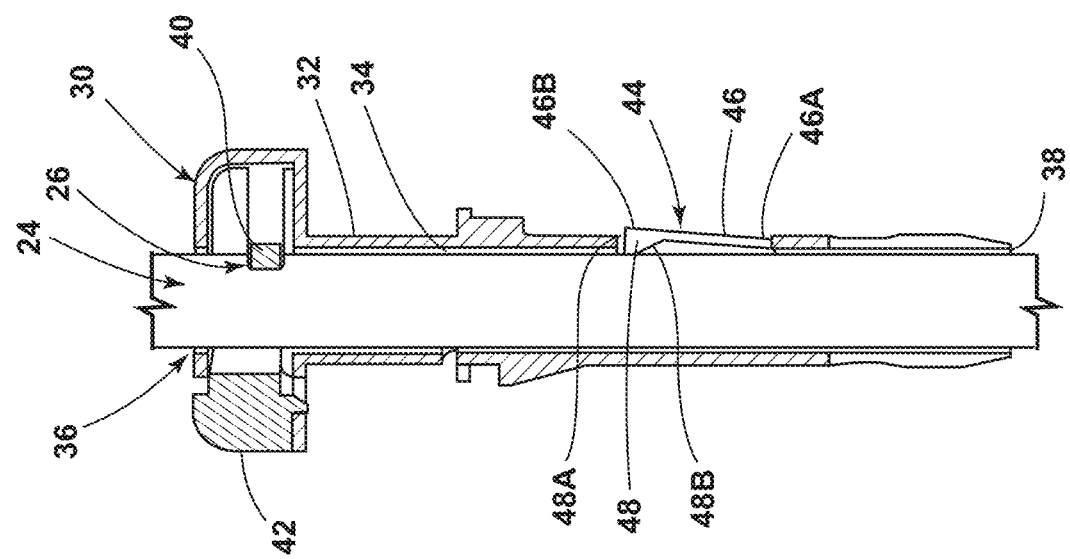
FIG. 6B is a sectional view of the receiving feature with a portion of the post disposed therein, illustrating the stop feature in an engaged position, according to one embodiment.

Referring still to FIGS. 6A and 6B, in some embodiments, the stop feature 44 may be operable between a disengaged position, as shown in FIG. 6A, and an engaged position, as shown in FIG. 6B. The stop feature 44 may be generally configured to prevent movement of the post 24 of the head restraint 20 in the inward direction relative to the seatback 18 while in the engaged position. In various embodiments, the stop feature 44 may generally prevent inward movement of the post 24 relative to the seatback 18 while in the engaged position by engaging one of the plurality of notches 26 defined by the post 24 of the head restraint 20. In various embodiments, the stop feature 44 may allow movement of the post 24 in the outward direction relative to the seatback while in the engaged position. In some embodiments, movement of the post 24 in the outward direction relative to the seatback 18 when the stop feature 44 is in the engaged position may cause the stop feature 44 to move from the engaged position to the disengaged position.

Referring further to FIGS. 6A and 6B, in some embodiments, the stop feature 44 may include an elongated member 46 that is coupled to the receiving feature 30. In various embodiments, the elongated member 46 may be coupled to the guide sleeve 32. As shown in FIGS. 6A and 6B, in some embodiments, the elongated member 46 may extend from a first end 46A to a second end 46B that is distal from the first end 46A. In various embodiments, the first end 46A of the elongated member 46 may be coupled to the guide sleeve 32. In some embodiments, the second end 46B of the elongated member 46 may be more proximate to the body 22 of the head restraint 20 than the first end 46A of the elongated member 46. In other words, the second end 46B may be nearer than the first end 46A of the elongated member 46 to the body 22 of the head restraint 20. In some embodiments, the first end 46A of the elongated member 46 may be more proximate to the tail portion 38 of the guide sleeve 32 than the second end 46B of the elongated member 46. In other words, the first end 46A may be closer than second end 46B to the tail portion 38 of the guide sleeve 32.

In various embodiments, the elongated member 46 may include a head portion 48. In various embodiments, the head portion 48 may be generally proximate to the second end 46B of the elongated member 46. The head portion 48 may include an upper surface 48A and a lower surface 48B. As shown in FIG. 6B, the upper surface 48A may be configured to engage the upper notch-defining wall 28A of the post 24 when the stop feature 44 is in the engaged position. This engagement of the upper notch-defining wall 28A of the post 24 may generally prevent inward movement of the post 24 of the head restraint 20 within the guide sleeve 32. In various embodiments, the lower surface 48B of the head portion 48 of the elongated member 46 may be configured to contact a portion of the post 24 as the post 24 moves in the outward direction within the guide sleeve 32 while the stop feature 44 is in the engaged position. In some embodiments, the portion of the post 24 that the lower surface 48B of the head portion 48 contacts may be the lower notch-defining wall 28C of the post 24. In various embodiments, the angle of incidence between the lower surface 48B of the head portion 48 and the portion of the post 24 contacting the lower surface 48B of the head portion 48 may cause the stop feature 44 to move toward the disengaged position as the post 24 moves in the outward direction relative to the seatback 18 within the guide sleeve 32. In other words, as the post 24 moves outward, the lower surface 48B of the head portion 48 may contact the portion of the post 24 of the head restraint 20 in such a way that, instead of preventing outward movement of the post 24, the head portion 48 yields toward the disengaged position of the stop feature 44, allowing the post 24 to move in the outward direction within the guide sleeve 32.

Referring still to FIGS. 6A and 6B, in some embodiments, the stop feature 44 may be generally biased toward the engaged position. For example, in some embodiments, in which the stop feature 44 includes the elongated member 46, the elongated member 46 may be integrally coupled with the guide sleeve 32 at the first end 46A and may be generally at rest while in the engaged position, as shown in FIG. 6B. In such embodiments, the elongated member 46 may be configured to resiliently flex generally outward as the elongated member 46 moves from the engaged position to the disengaged position, as shown in FIG. 6A. While in the disengaged position, the elongated member 46 may be generally biased inward toward the engaged position where it is at rest. As shown in FIG. 6A, the elongated member 46 may be maintained in the disengaged position via contact between the head portion 48 of the elongated member 46 and an outer surface of the post 24 of the head restraint 20. When the post 24 of the head restraint 20 is moved within the guide sleeve 32, such that one of the plurality of notches 26 aligns with the elongated member 46 to receive the head portion 48, the elongated member 46 is allowed to resiliently flex back to the at rest position (the engaged position) as shown in FIG. 6B.

Referring now to FIGS. 5A-7B, in some embodiments, the head restraint 20 may be operable between a plurality of locking positions. Each locking position may be characterized by the locking feature 40 being in the locked condition. In other words, the head restraint 20 may be deemed to be in a locking position when the locking feature 40 is in the locked condition, such that inward and outward movement of the post 24 of the head restraint 20 relative to the seatback 18 is generally prevented by the locking feature 40.

In various embodiments, the head restraint 20 may be operable to enter a low position, wherein the stop feature 44 is in the engaged position. In various embodiments, the head restraint 20 may be generally prevented from moving further inward relative to the seatback 18 of the seating assembly 14 by the stop feature 44 when the head restraint 20 is in the low position. An exemplary low position of the head restraint 20 is illustrated in FIG. 7B, wherein the stop feature 44 is engaged with one of the plurality of notches 26 defined by the post 24 of the head restraint 20, such that inward movement of the post 24 within the guide sleeve 32 is generally prevented. In various embodiments, the post 24 of the head restraint 20 may be generally prevented from moving inward relative to the seatback 18 within the guide sleeve 32 further than the position of the post 24 when the head restraint 20 is in the low position. As shown in FIG. 7B, in various embodiments, the body 22 of the head restraint 20 may be spaced-apart from the seatback 18, such that a gap exists between the body 22 of the head restraint 20 and the seatback 18 when the head restraint 20 is in the low position. In some embodiments, no portion of the body 22 of the head restraint 20 is in contact with the seatback 18 of the seating assembly 14 when the head restraint 20 is in the low position.

Referring now to FIGS. 7A and 7B, in various embodiments, the head restraint 20 may be operable to enter a seatback-outward-most locking position. In other words, in some embodiments, the head restraint 20 may be operable to enter a locking position in which the head restraint 20 is disposed farther outward from the seatback 18 of the seating assembly 14 than the head restraint 20 is when positioned in the other locking positions. For example, as shown in FIG. 7A, the head restraint 20 is in the seatback-outward-most locking position, as the locking feature 40 is engaged with the furthest notch 26 away from the body 22 of the head restraint 20. In this locking position, engaging the locking feature 40 with any of the other notches 26 defined by the post 24 would result in the head restraint 20 being in a locking position farther inward relative to the seatback 18 than the seatback-outward-most locking position.

As shown in FIGS. 7A and 7B, respectively, in some embodiments, the notch 26 that the locking feature 40 is engaged with when the head restraint 20 is in the seatback-outward-most locking position (FIG. 7A) may be the same notch 26 that is engaged by the stop feature 44 when the head restraint 20 is in the low position (FIG. 7B). As shown in FIG. 7B, in some embodiments, the head restraint 20 may be operable to enter a locking position that corresponds with the low position of the head restraint 20. In other words, the locking feature 40 may be operable to engage one or more of the plurality of notches 26 while the stop feature 44 is engaged with one of the plurality of notches 26 as well. In such an embodiment, the locking feature 40 may be disengaged, such that both inward and outward movement of the post 24 within the guide sleeve 32 is generally unimpeded by the locking feature 40; however, the stop feature 44 would still generally prevent inward movement of the post 24 within the guide sleeve 32. It is contemplated that, in some embodiments, the position of the head restraint 20 while in the low position may be generally nearer to the seatback 18 of the seating assembly 14 than the position of the head restraint 20 when the head restraint 20 is in the seatback-inward-most locking position.

In some embodiments, the position of the head restraint 20 while in the seatback-outward-most locking position may be a first distance in the outward direction from the position of the head restraint 20 while in the low position. In some examples, the head restraint 20 may be operable to enter one of the plurality of locking positions when the head restraint 20 is moved in the outward direction from the low position a second distance, wherein the second distance is about one half of the first distance. For example, in some embodiments, the position of the head restraint 20 while in the low position may be 10 cm outward from the position of the head restraint 20 while in the seatback-outward-most locking position, and movement of the head restraint 20 in the outward direction from the low position about 5 cm (i.e., about one half of 10 cm) may position the head restraint 20 such that the position of the head restraint 20 corresponds with one of the locking positions of the head restraint 20.

In some embodiments, in which the position of the head restraint 20 while in the seatback-outward-most locking position is a first distance in the outward direction from the position of the head restraint 20 while in the low position, movement of the head restraint 20 in the outward direction from a first position to a second position may cause the head restraint 20 to enter one of the plurality of locking positions, wherein the first position is a second distance from the low position in the outward direction, the second position is a third distance from the first position in the outward direction, the second distance is about one half of the first distance, and the third distance is between about 1 mm to about 10 mm. In other words, the head restraint 20 would encounter a locking position when moved in the outward direction relative to the seatback 18 from the low position when the head restraint 20 is in a position between 1 mm and 10 mm further outward from the seatback 18 than one half of the distance in the outward direction between the position of the head restraint 20 while in the low position and the position of the head restraint 20 while in the seatback-outward-most locking position.

In operation of a non-limiting exemplary embodiment, the user of the seating assembly 14 may adjust the position of the head restraint 20 relative to the seatback 18 of the seating assembly 14 by depressing the actuator 42 of the locking feature 40 to move the locking feature 40 from the locked condition, wherein the locking feature 40 is engaged with one of the plurality of notches 26 defined by the post 24 of the head restraint 20, to the unlocked condition, wherein the locking feature 40 is disengaged from the notch 26 defined by the post 24 of the head restraint 20. After depressing the actuator 42 to move the locking feature 40 to the unlocked condition, the user may then move the head restraint 20 in the inward direction, such that the post 24 of the head restraint 20 slides within the receiving feature 30 as the head restraint 20 moves toward the seatback 18 of the seating assembly 14. The head restraint 20 is moved in this way until the head restraint 20 reaches the low position, wherein the stop feature 44 aligns with a notch 26 defined by the post 24 of the head restraint 20, which allows the stop feature 44 to move from the disengaged position to the engaged position, in which the stop feature 44 engages the notch 26. While in the engaged position, the stop feature 44 generally prevents further inward movement of the post 24 within the receiving feature 30, such that the head restraint 20 is generally prevented from sliding further toward the seatback 18. The user may then move the head restraint 20 outward relative to the seatback 18 to a locking position spaced-apart from the low position of the head restraint 20. In moving the head restraint 20 outward from the low position, the stop feature 44 is moved from the engaged position to the disengaged position. As the head restraint 20 moves into a locking position, the locking feature 40 engages with one of the plurality of notches 26 defined by the post 24 of the head restraint 20 in accordance with its inward bias to move the locking feature 40 into the locked condition. In the locking position, the head restraint 20 is generally prevented from moving in the inward and outward directions relative to the seatback 18.

The present disclosure may provide a variety of advantages. First, the stop feature 44 may be operable to move from the disengaged position to the engaged position without the need for actuation of the stop feature 44 by the user. Second, the stop feature 44 may allow movement of the head restraint 20 in the outward direction relative to the seatback 18 when the stop features 44 in the engaged position. Third, the stop feature 44 may enable the body 22 of the head restraint 20 to be spaced-apart from the seatback 18 when the head restraint 20 is in the low position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly, comprising:
a seatback coupled to a seat-base;
a receiving feature coupled to the seatback;
a locking feature coupled to the receiving feature;
a stop feature coupled to the receiving feature;
a head restraint operably coupled to the seatback and comprising:
  a body; and
  a post protruding outward from the body and configured for mating engagement with the receiving feature, the post defining a plurality of notches, wherein the post is operable to move within the receiving feature in an inward direction and an outward direction relative to the seatback to adjust the position of the head restraint relative to the seatback, the locking feature is operable between a locked condition, in which the locking feature is engaged with at least one of the plurality of notches to generally prevent movement of the post in both the inward and outward directions relative to the seatback, and an unlocked condition, in which the locking feature is not engaged with the plurality of notches, such that movement of the post within the receiving feature in the inward and outward directions is generally unimpeded by the locking feature, and the stop feature is operable between a disengaged position and an engaged position, in which the stop feature is engaged with at least one of the plurality of notches, such that movement of the post in the inward direction is generally prevented and movement of the post in the outward direction causes the stop feature to move from the engaged position to the disengaged position.

2. The vehicle seating assembly of claim 1, wherein the head restraint is operable between a plurality of locking positions, each characterized by the locking feature being in the locked condition, and a low position, wherein the stop feature is in the engaged position.

3. The vehicle seating assembly of claim 2, wherein the position of the head restraint while in a seatback-outward-most locking position is a first distance in the outward direction from the position of the head restraint while in the low position.

4. The vehicle seating assembly of claim 3, wherein the notch engaged by the locking feature when the head restraint is in the seatback-outward-most locking position is engaged by the stop feature when the head restraint is in the low position.

5. The vehicle seating assembly of claim 3, wherein the head restraint is operable to enter one of the plurality of locking positions when moved in the outward direction from the low position a second distance, wherein the second distance is about one half of the first distance.

6. The vehicle seating assembly of claim 3, wherein movement of the head restraint in the outward direction from a first position to a second position causes the head restraint to enter one of the plurality of locking positions, the first position is a second distance from the low position in the outward direction, the second position is a third distance from the first position in the outward direction, the second distance is about one half of the first distance, and the third distance is between about 1 mm and about 10 mm.

7. The vehicle seating assembly of claim 1, wherein the receiving feature comprises:
a guide sleeve at least partially disposed within the seatback.

8. The vehicle seating assembly of claim 7, wherein the stop feature comprises:
an elongated member coupled to the guide sleeve at a first end and extending from the first end to a second end that is distal from the first end.

9. The vehicle seating assembly of claim 8, wherein the second end of the elongated member is more proximate to the body of the head restraint than the first end of the elongated member when the head restraint is in the low position.

10. The vehicle seating assembly of claim 8, wherein the elongated member is biased toward the engaged position while in the disengaged position.

11. The vehicle seating assembly of claim 10, wherein the elongated member is configured to resiliently flex as the elongated member moves from the engaged position to the disengaged position.

12. The vehicle seating assembly of claim 8, wherein the elongated member further comprises:

a head portion proximate the second end of the elongated member and comprising:
- an upper surface configured to engage an upper notch-defining wall of the post when the stop feature is in the engaged position; and
- a lower surface configured to contact a portion of the post as the movement of the post in the outward direction causes the stop feature to move toward the disengaged position, wherein the angle of incidence between the lower surface and the portion of the post contacting the lower surface causes the stop feature to move toward the disengaged position as the post moves in the outward direction.

13. A vehicle seating assembly, comprising:
a head restraint having a body and a post extending outward from the body;
a receiving feature coupled to a seatback and configured to receive the post;
a locking feature coupled to the receiving feature and operable between an unlocked condition and a locked condition, in which the locking feature is engaged with the post to generally prevent movement of the post in a first direction and a second direction generally opposite the first direction, wherein movement in the second direction causes the body of the head restraint to move generally away from the seatback; and
a stop feature coupled to the receiving feature and operable to move from a disengaged position to an engaged position, wherein the stop feature is generally configured to prevent movement of the post within the receiving feature in the first direction and allow movement of the post within the receiving feature in the second direction, and wherein movement of the post within the receiving feature in the second direction causes the stop feature to move from the engaged position to the disengaged position.

14. The vehicle seating assembly of claim 13, wherein the stop feature is configured to be engaged with a notch defined by the post while in the engaged position.

15. The vehicle seating assembly of claim 13, wherein the stop feature is configured to be in contact with the post while in the disengaged position when the post is received within the receiving feature.

16. The vehicle seating assembly of claim 13, wherein the stop feature is biased toward the engaged position.

17. A vehicle seating assembly, comprising:
a head restraint having a post;
a seatback having a receiving feature configured to receive a portion of the post therein;
a locking feature coupled to the receiving feature and operable between an unlocked condition and a locked condition, in which the locking feature is engaged with the post to generally prevent inward and outward movement of the post relative to the seatback; and
a stop feature coupled to the receiving feature and movable between a disengaged position and an engaged position, wherein the stop feature is configured to generally prevent inward movement and allow outward movement of the post relative to the seatback.

18. The vehicle seating assembly of claim 17, wherein outward movement of the post causes the stop feature to move from the engaged position to the disengaged position.

19. The vehicle seating assembly of claim 17, wherein the stop feature is generally biased toward the engaged position.

20. The vehicle seating assembly of claim 17, wherein the stop feature is configured to be in contact with the post while in the disengaged position when the post is received within the seatback.

* * * * *